Patented June 20, 1950

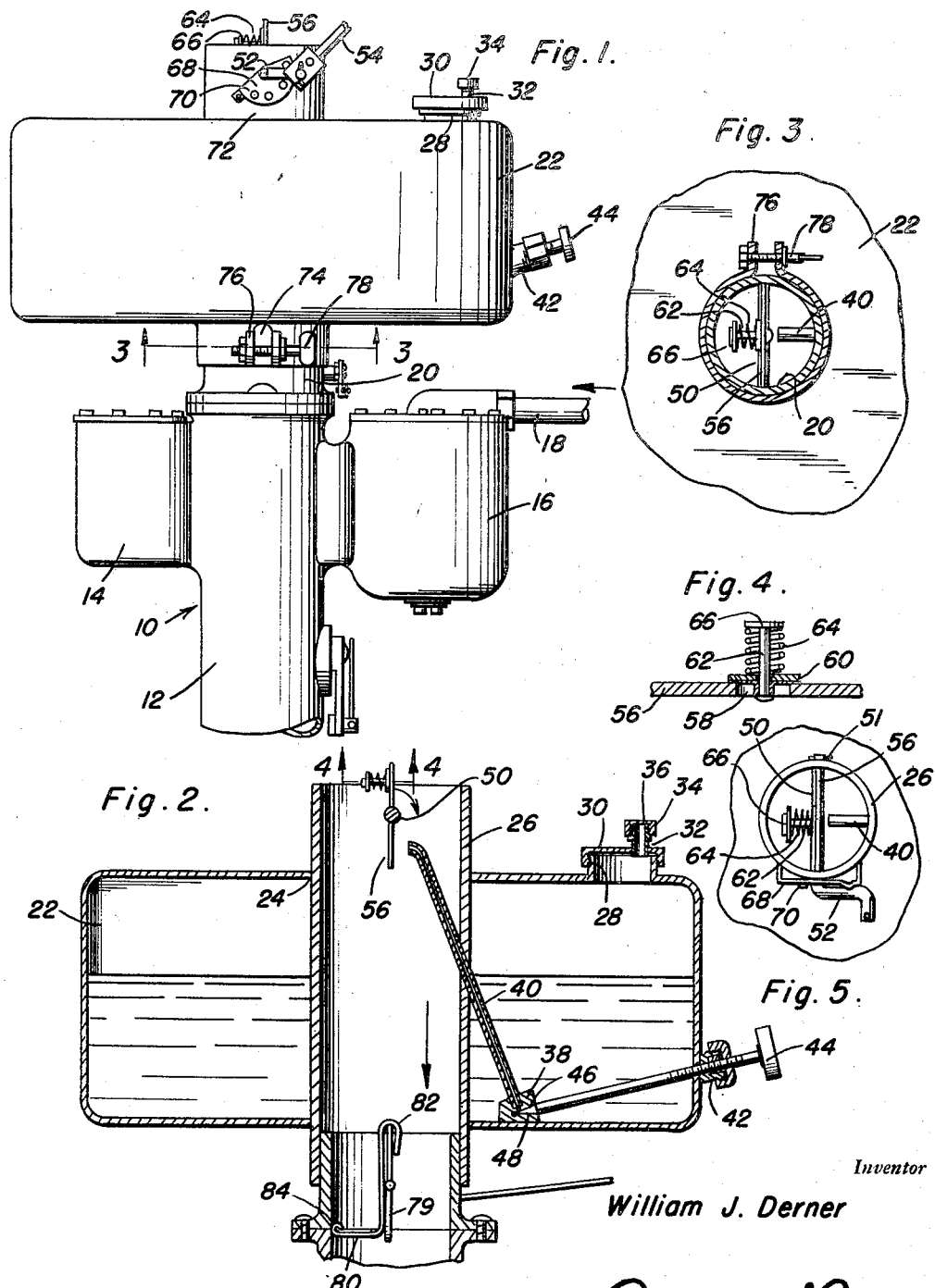

2,512,225

UNITED STATES PATENT OFFICE 2,512,225

EMERGENCY GASOLINE TANK

William J. Derner, Buffalo, N. Y.

Application September 16, 1947, Serial No. 774,277

1 Claim. (Cl. 261—71)

This invention relates to new and useful improvements in emergency gasoline tanks and the primary object of the present invention is to provide an emergency tank including novel and improved means for regulating the passage of fuel from the tank into the flow pipe of an automobile engine.

Another important object of the present invention is to provide an emergency gasoline tank that is quickly and readily applied to the air intake nipple of a carburetor to replace an air filter, so that the emergency tank may supply fuel to the engine when the main tank is empty.

A further object of the present invention is to provide an auxiliary fuel tank for vehicles including a valve actuating lever which is operatively connected to the dash board of a vehicle whereby the supply of fuel from the tank to the engine may be selectively controlled.

A still further aim of the present invention is to provide an auxiliary gasoline tank that is simple and practical in construction, strong and reliable in use, relatively inexpensive to manufacture and otherwise well adapted for the purposes for which the same is intended.

Other objects and advantages reside in the details of construction and operation as more fully hereinafter described and claimed, reference being had to the accompanying drawings forming part hereof, wherein like numerals refer to like parts throughout, and in which:

Figure 1 is a fragmentary elevational view of a portion of an automobile engine, and showing the present invention applied thereto;

Figure 2 is a vertical sectional view of the present invention taken substantially through the center of Figure 1;

Figure 3 is a horizontal sectional view taken substantially on the plane of section line 3—3 of Figure 1;

Figure 4 is an enlarged horizontal sectional view taken substantially on the plane of section line 4—4 in Figure 2; and, Figure 5 is a top plan view of the present auxiliary fuel tank, and with parts thereof broken away and shown in section.

Referring now to the drawings in detail, wherein for the purpose of illustration there is disclosed a preferred embodiment of the present invention, the numeral 10 represents a portion of an automobile engine generally, comprising a flow pipe 12, a carburetor 14, a carburetor bowl 16, a fuel line 18 and an extension or air intake nipple 20 for the upper end of said flow pipe which normally receives an air filter (not shown). The present invention does not attempt to claim the above conventional structure, but is merely an attachment therefor which will afford an auxiliary fuel supply means to the flow pipe.

The numeral 22 represents an auxiliary tank or reservoir preferably cylindrical in form and having central apertures 24 in its upper and lower walls for engaging a centrally disposed sleeve 26, that is rigidly secured to the tank with its terminals projecting outwardly from the respective upper and lower walls of the tank.

A filling nipple or neck 28 is provided in the upper wall of the tank and engageably receives a closure cap 30. This closure cap 30 is provided with an air inlet tube 32 having a closure 34 which is provided with a port 36, so that either air or fuel may be inserted into the tank.

Rigidly secured to the bottom wall of the tank 22, is a supporting block 38 that engages one terminal of an upwardly inclined conduit 40 that extends through the walls of sleeve 26 and into substantially the center of said sleeve adjacent its upper end. The conduit 40 is secured by welding or the like to both the inner and outer faces of the sleeve where it extends therethrough, to prevent an accidental passage of fuel from entering the sleeve through the tank.

A packing gland 42 carried by the outer periphery of the tank 22, is disposed at an inclined angle to the axis of sleeve 26. This gland 42 receivably engages a needle valve 44 having its pointed inner end 46 adjustably engaging a substantially conical aperture 48 provided in block 38, which communicates with conduit 40 for regulating the amount of fuel within the tank that is permitted to enter the conduit 40.

A pivot rod 50 extends through the upper terminal of sleeve 26, and is retained in position thereto for pivotal movement, by a removable cotter pin or the like 51 that extends through one terminal of the rod. The opposite terminal of the rod 50 is bent to form a crank handle 52 which is operatively connected to a link 54 that may extend to the dash board of a vehicle with which the device is associated. Fixedly carried by rod 50, is a butterfly valve 56 for controlling the air intake through the sleeve 26. A relief port 58 is provided in the valve 56 which is normally closed by a washer 60 slidably mounted on the vertical portion of an angular bar 62 that is suitably secured to the edge of the valve 56 outlining port 58.

A coil spring 64 is biased between the washer 60 and a retaining disc 66 rigidly carried by the outer terminal of bar 62, for retaining the washer 60 in a closed position relative to port 58.

For the purpose of retaining the valve 56 in selected adjusted positions, there is provided a substantially crescent-shaped plate 68 rigidly secured to the outer periphery of sleeve 26. This plate is provided with spaced protuberances 70 between which the crank arm 52 may be frictionally disposed either directly or by actuation of link 54. It is preferred that suitable indicia 72 as indicated in Figure 1, be applied to the sleeve and between the protuberances 70, so that the operator may observe the position of the valve 56 within the sleeve. Also, these indicia should be placed on the dash board (not shown) of the vehicle whereby the driver may selectively adjust the valve 56 from within the vehicle.

In practical use of the device, the lower terminal of sleeve 26 is provided with a slot 74 and a pair of spaced parallel ears 76 carried by the sleeve adjacent slot 74 receivably engage a fastener 78 to permit the sleeve to clampingly engage extension 20, when the air filter (not shown) normally disposed on the extension is removed therefrom.

When the vehicle engine is started, and the valves 44 and 56 are in an open position, fuel is drawn from the tank 22 through conduit 40, into sleeve 26 and hence through the flow pipe 20. Obviously, after the engine has started, the valve 56 may be adjusted to a selected position between the protuberances 70 for efficiently supplying air into the flow pipe.

It should be noted, that when one person is operating the device in cold weather, it may be necessary to provide a means whereby the automatic choke 79 for the system will remain in an open position while the person is starting the engine. To satisfy this requirement, there is provided a substantially L-shaped member 80 having a spring clip 82 formed at one terminal that engages valve 79, and the opposite terminal of said member 80 is looped, as at 84, to provide a bearing portion that frictionally bears against the inner periphery of the sleeve 26, to hold the valve in a vertical and fully open position in the sleeve as shown in Figure 2.

In view of the foregoing description taken in conjunction with the accompanying drawings it is believed that a clear understanding of the construction, operation and advantages of the device will be quite apparent to those skilled in this art. A more detailed description is accordingly deemed unnecessary.

It is to be understood, however, that even though there is herein shown and described a preferred embodiment of the invention the same is susceptible to certain changes fully comprehended by the spirit of the invention as herein described and the scope of the appended claim.

Having described the invention, what is claimed as new is:

An emergency gasoline tank for automobiles comprising a fuel tank, an axial sleeve carried by said tank, one terminal of said sleeve adapted to engage a portion of an automobile engine carburetor after the removal of an air filter therefrom, a filling nipple in the top wall of said tank, a closure for said filling nipple, said closure having an air vent, a further closure for said air vent, means for retaining said sleeve relative to the carburetor, a conduit leading from said tank to said sleeve and having a lower intake end disposed in said tank, means for regulating the amount of fuel entering said conduit, a butterfly valve mounted within said sleeve, an operating arm pivoted on said sleeve and connected to said butterfly valve, a plate having a plurality of protuberances carried by said sleeve, and a crank handle carried by said arm for selective positioning between said protuberances.

WILLIAM J. DERNER.

REFERENCES CITED

The following references are of record in the file of this patent:

UNITED STATES PATENTS

| Number | Name | Date |
|---|---|---|
| 1,057,506 | Stevens | Apr. 1, 1913 |
| 1,742,376 | Beard | Jan. 7, 1930 |
| 2,347,427 | Mock et al. | Apr. 25, 1944 |
| 2,389,685 | Pike | Nov. 27, 1945 |